(12) United States Patent
Borlick et al.

(10) Patent No.: US 10,659,472 B2
(45) Date of Patent: *May 19, 2020

(54) METHOD, SYSTEM, AND COMPUTER PROGRAM PRODUCT FOR PROVIDING SECURITY AND RESPONSIVENESS IN CLOUD BASED DATA STORAGE AND APPLICATION EXECUTION

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,517

(22) Filed: Nov. 6, 2018

(65) Prior Publication Data
US 2019/0075119 A1    Mar. 7, 2019

Related U.S. Application Data

(63) Continuation of application No. 15/130,481, filed on Apr. 15, 2016, now Pat. No. 10,154,044.

(51) Int. Cl.
*H04L 29/06* (2006.01)
*H04L 29/08* (2006.01)

(52) U.S. Cl.
CPC .......... *H04L 63/105* (2013.01); *H04L 63/102* (2013.01); *H04L 67/1097* (2013.01)

(58) Field of Classification Search
None
See application file for complete search history.

(56) References Cited

U.S. PATENT DOCUMENTS

| 8,977,848 B1 * | 3/2015 | Tomlinson | G06F 9/5061 713/166 |
| 2009/0007246 A1 * | 1/2009 | Gutowski | H04L 63/20 726/6 |

(Continued)

OTHER PUBLICATIONS

A. Westphal, et al., "IBM System Storage DS8000 Architecture and Implementation", IBM Corporation, Document No. SG24-8886-02, Nov. 2012, pp. 534.

(Continued)

*Primary Examiner* — J. Brant Murphy
*Assistant Examiner* — Hassan Saadoun
(74) *Attorney, Agent, or Firm* — Konrad Raynes Davda & Victor LLP; Rabindranath Dutta

(57) ABSTRACT

A storage controller that is coupled to a plurality of storage clouds is maintained. The storage controller determines security requirements for performing a selected operation in the plurality of storage cloud. A subset of storage clouds of the plurality of storage clouds that are able to satisfy the security requirements are determined. A determination is made as to which storage cloud of the subset of storage clouds is most responsive for performing the selected operation. The selected operation is performed in the determined storage cloud that is most responsive.

18 Claims, 10 Drawing Sheets

(56) References Cited

U.S. PATENT DOCUMENTS

| | | | | |
|---|---|---|---|---|
| 2012/0130874 A1* | 5/2012 | Mane | ............... | G06Q 30/04 |
| | | | | 705/34 |
| 2012/0278642 A1* | 11/2012 | Sarkar | ............... | G06F 3/0625 |
| | | | | 713/323 |
| 2013/0080408 A1* | 3/2013 | Cashman | ............ | G06F 3/0608 |
| | | | | 707/692 |
| 2017/0302678 A1 | 10/2017 | Borlick et al. | | |

OTHER PUBLICATIONS

"Common Criteria for Information Technology Security Evaluation" (abbreviated as Common Criteria or CC), Wikipedia, pp. 4, [online][retrieved Apr. 8, 2016] https://en.wikipedia.org/wiki/Common_Criteria.
U.S. Appl. No. 14/961,166, filed Dec. 7, 2015.
U.S. Appl. No. 14/961,247, filed Dec. 7, 2015.
U.S. Appl. No. 14/961,208, filed Dec. 7, 2015.
U.S. Appl. No. 15/078,185, filed Mar. 23, 2016.
U.S. Appl. No. 15/078,187, filed Mar. 23, 2016.
U.S. Appl. No. 15/130,649, filed Apr. 15, 2016.
Office Action 1 for U.S. Appl. No. 15/130,481, dated Jan. 19, 2018, 23 pp.
Response to Office Action 1 for U.S. Appl. No. 15/130,481, dated Apr. 19, 2018, 15 pp.
Response to Notice of Non-Compliant Amendment for U.S. Appl. No. 15/130,481, dated May 15, 2018, 9 pp.
Notice of Allowance 1 for U.S. Appl. No. 15/130,481, dated Nov. 6, 2018, 11 pp.
List of IBM Patents or Patent Applications Treated as Related, dated Nov. 6, 2018, pp. 2.

* cited by examiner

METHOD, SYSTEM, AND COMPUTER PROGRAM PRODUCT FOR PROVIDING SECURITY AND RESPONSIVENESS IN CLOUD BASED DATA STORAGE AND APPLICATION EXECUTION

CROSS-REFERENCE TO RELATED APPLICATION

This application is a continuation of U.S. patent application Ser. No. 15/130,481, filed Apr. 15, 2016, which application is incorporated herein by reference in its entirety.

BACKGROUND

1. Field

Embodiments relate to a method, system, and computer program product for providing security and responsiveness in cloud based data storage and application execution.

2. Background

Cloud storage is a model of data storage in which digital data is stored in logical pools, and the physical storage spans a plurality of servers. The physical storage environment may be owned and managed by a hosting company. These cloud storage providers may be responsible for keeping the data available and accessible, and for keeping the physical environment protected and maintained properly. People and organizations may buy or lease storage capacity from the cloud storage providers to store user, organization, or application data.

In certain storage system environments a storage controller may comprise a plurality of storage servers that are coupled to each other, where one or more of the storage servers may comprise a plurality of processing nodes or servers. The storage controller allows host computing systems to perform input/output (I/O) operations with storage devices controlled by the storage controller. Further details of a storage controller may be found in the publication "IBM System Storage DS8000: Architecture and Implementation," Third Edition, published November 2012, by International Business Machines Corporation.

SUMMARY OF THE PREFERRED EMBODIMENTS

Provided are a method, a system, and a computer program product in which a storage controller that is coupled to a plurality of storage clouds is maintained. The storage controller determines security requirements for performing a selected operation in the plurality of storage cloud. A subset of storage clouds of the plurality of storage clouds that are able to satisfy the security requirements are determined. A determination is made as to which storage cloud of the subset of storage clouds is most responsive for performing the selected operation. The selected operation is performed in the determined storage cloud that is most responsive.

In further embodiments, the selected operation comprises storing a dataset.

In yet further embodiments, the selected operation further comprises executing an application.

In certain embodiments the storage controller maintains a security level indicator that indicates a level of security certification of each of the plurality of storage clouds. A determination is made of a minimum level of security certification required to satisfy the security requirements for performing the selected operation. A determination is made of the subset of storage clouds of the plurality of storage clouds that are able to provide the minimum level of security certification, wherein the determination is made from the security level indicator.

In further embodiments, the level of security certification comprises Evaluation Assurance Levels (EAL) ranging from 1 to 7 in a Common Criteria standard.

In additional embodiments, the storage controller maintains a responsiveness indicator that indicates a degree of responsiveness of each of the plurality of storage clouds based on historical statistics collected on responsiveness of each of the plurality of storage clouds for responding to the storage controller. The storage controller determines which storage cloud of the subset of storage clouds is most responsive for performing the selected operation from the degree of responsiveness indicated in the responsiveness indicator.

In further embodiments, the responsiveness indicator indicates a degree of responsiveness for storing datasets in the plurality of storage clouds and for input/output (I/O) operations with stored datasets in the plurality of storage clouds, and a degree of responsiveness for executing operations in the plurality of storage clouds.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

An application or dataset may have certain security requirements. A storage controller may be able to access various storage clouds but only some of the storage clouds may provide security that the application or dataset needs. Certain embodiments provide mechanisms to use the best storage cloud based on response time of the storage cloud and security needs of the application or dataset.

In certain embodiments, a storage controller determines the minimum security level required for an application or a dataset. The storage controller first determines which subset of storage clouds can provide at least the minimum security level for the application and/or dataset. Within the subset of determined storage clouds, the storage cloud with the best response time may be selected for executing the application or for storing the dataset.

Exemplary Embodiments

Figure 1:
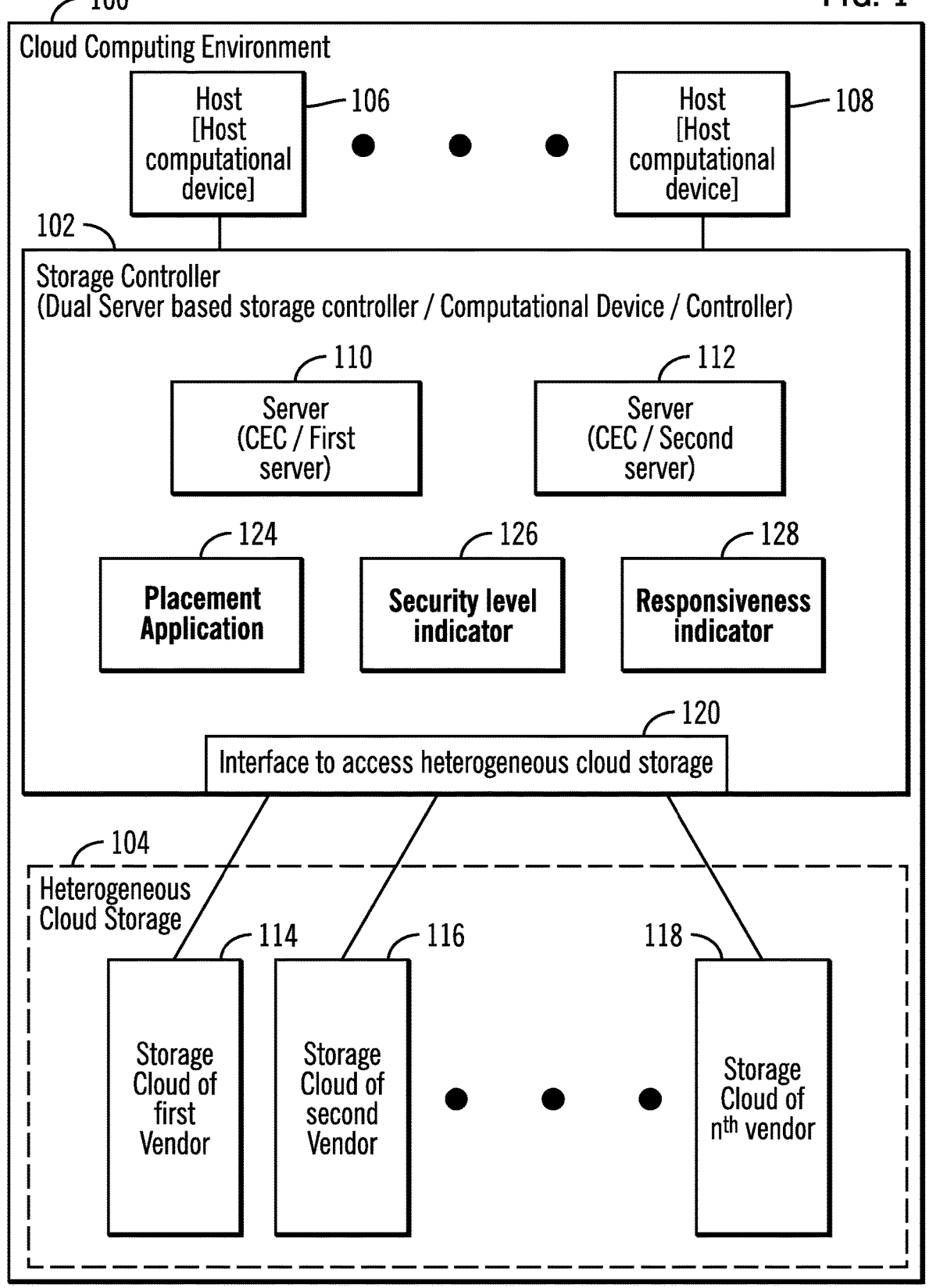
FIG. 1 illustrates a block diagram of a cloud computing environment comprising a dual server based storage controller coupled to a heterogeneous cloud storage comprising storage clouds distributed over a plurality of geographical locations, in accordance with certain embodiments.

FIG. 1 illustrates a block diagram of a cloud computing environment 100 comprising a storage controller 102 coupled to a heterogeneous cloud storage 104 comprising storage clouds distributed over a plurality of geographical locations, in accordance with certain embodiments. The storage controller 102 allows a plurality of hosts 106, 108 (e.g., host computational devices) to perform input/output (I/O) operations with logical storage maintained by the storage controller 102. The physical storage corresponding to the logical storage may be found in at least the heterogeneous cloud storage 104.

The storage controller 102 comprises a plurality of server computational devices 110, 112. The server computational devices 110, 112 may also be referred to as servers or central electronic complexes (CEC) or processor complexes. The storage controller 102 may comprise a set of hardware that includes central processing units (CPU), memory, channels, controllers, and other elements. The storage controller 102 may be referred to as a dual server based storage controller because of the presence of the servers 110, 112 in the storage controller 102. The servers 110, 112 of the storage controller 102 and the hosts 106, 108 may comprise any suitable computational device including those presently known in the art, such as, a personal computer, a workstation, a server, a mainframe, a hand held computer, a palm top computer, a telephony device, a network appliance, a blade computer, a processing device, etc. The servers 110, 112, the storage controller 102, and the hosts 106, 108 may be elements in any suitable network, such as, a storage area network, a wide area network, the Internet, an intranet. In certain embodiments, the servers 110, 112 may function redundantly and one server may be able to take over the operations of the other server. In certain embodiments, the servers 110, 112 of the storage controller 102, the hosts 106, 108, and the heterogeneous cloud storage 104 may be elements in a cloud computing environment that comprises the computing environment 100. In certain embodiments, the storage controller 102 may have just one storage server and may not be in a dual server configuration.

The heterogeneous cloud storage 104 may be comprised of a plurality of storage clouds 114, 116, 118 where each of the plurality of storage clouds may be provided and maintained by a different entity, and where each of the plurality of storage clouds may be maintained in different geographical locations. For example, a first vendor may provide the storage cloud 114, a second vendor may provide the storage cloud 116, and a third vendor may provide the storage cloud 118. The different storage clouds 114, 116, 118 may be placed at different geographical locations separated by a considerable distance, such as at least 10 kilometers, or for that matter in different countries or continents.

Each storage cloud 114, 116, 118 may be comprised of a plurality of storage devices, such as storage disks, tape drives, solid state storage, etc., that are maintained by a storage server (referred to as a cloud server) that has an operating system. In certain embodiments, the storage cloud 114 maintained by the first vendor may be in a first geographical location and may have one operating system, whereas the storage cloud 116 maintained by the second vendor may be in a second geographical location and may have another operating system.

The storage controller 102 may have an interface 120 to access the heterogeneous cloud storage 104. Additionally, a placement application 124 that distributes and aggregates datasets and executes applications of the servers 110, 112 in different storage clouds in the heterogeneous cloud storage 104 may execute in the storage controller 102. The placement application 124 may be implemented in software, firmware, or hardware, or any combination thereof, in accordance with certain embodiments.

In certain embodiments, the placement application 124 uses information stored in the security level indicator 126 and the responsiveness indictor 128 to place datasets in one of the plurality of storage clouds 114, 116, 118 based on security level needs of the datasets and the responsiveness of the storage clouds 114, 116, 118.

Figure 2:
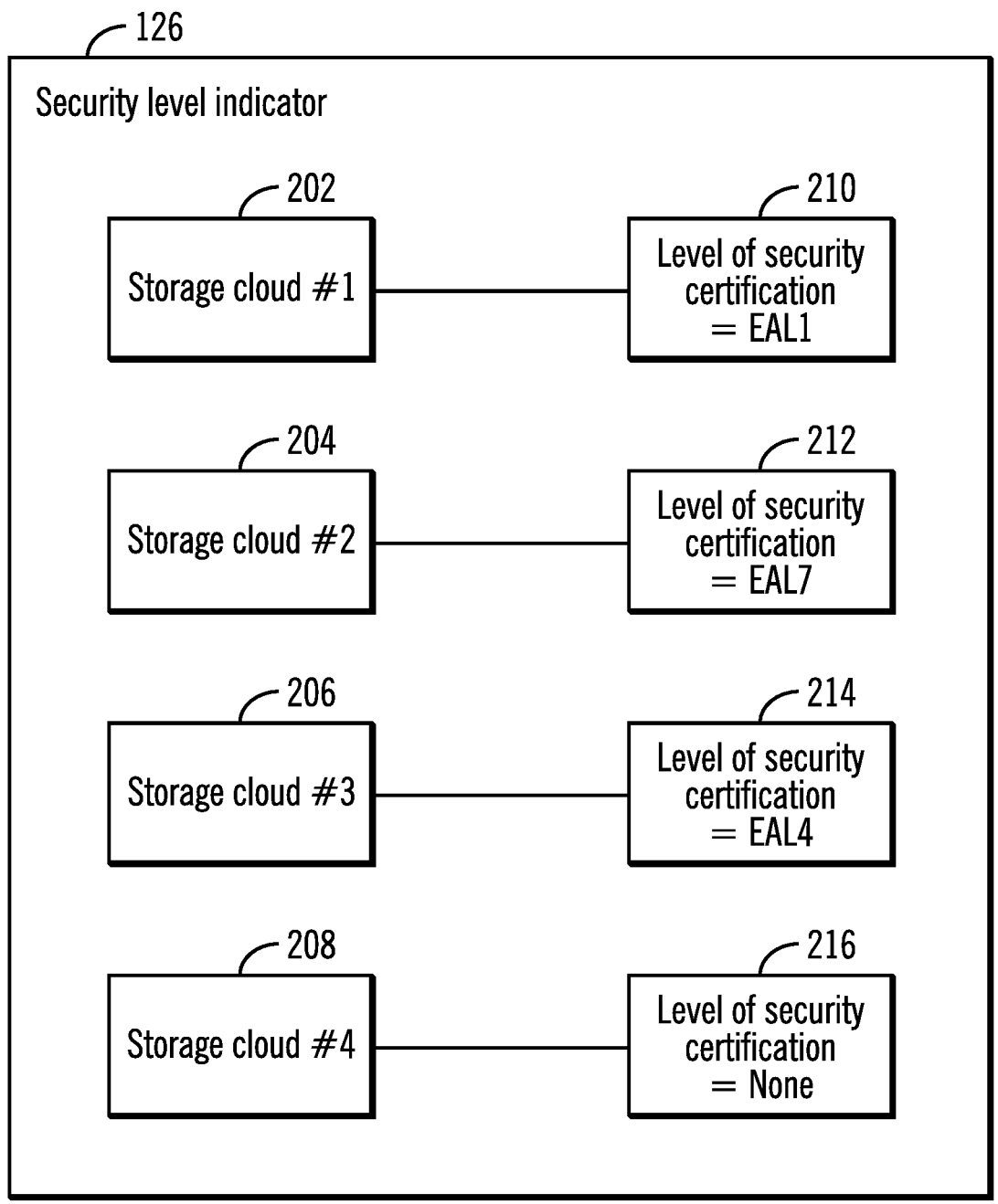
FIG. 2 illustrates a block diagram that shows a security level indicator in the storage controller, in accordance with certain embodiments.

FIG. 2 illustrates a block diagram that shows a security level indicator 126 in the storage controller 102, in accordance with certain embodiments. The security level indicator 126 shows the level of security provided by each of the storage clouds to which the storage controller 102 is coupled.

For example, if the storage controller 102 is coupled to four storage clouds 202, 204, 206, 208 that are managed by different vendors than the vendors may have received security certifications from independent or external agencies for their storage cloud and notified the administrator of the storage controller 102 of the security certifications. For example, in certain embodiments storage clouds 202, 204, 206 may have undergone Common Criteria based security certifications and may have secured evaluation assurance level (EAL) certifications of EAL1, EAL7, EAL4 respectively, where in certain Common Criteria based security certification schemes EAL1, EAL2, EAL3, EAL4, EAL5, EAL6, EAL7 are certifications ranked from the least secure to the most secure. In such embodiments, the security level indicator 128 indicates EAL1 as the level of security certification of storage cloud 202 (as shown via reference numeral 210), EAL7 as the level of security certification of storage cloud 204 (as shown via reference numeral 212), and EAL4 as the level of security certification of storage cloud 206 (as shown via reference numeral 214). Since storage cloud 208 has not been evaluated for security certification, the security level indicator 128 indicates "None" as the level of security certification of storage cloud 208 (as shown via reference numeral 216).

Figure 3:
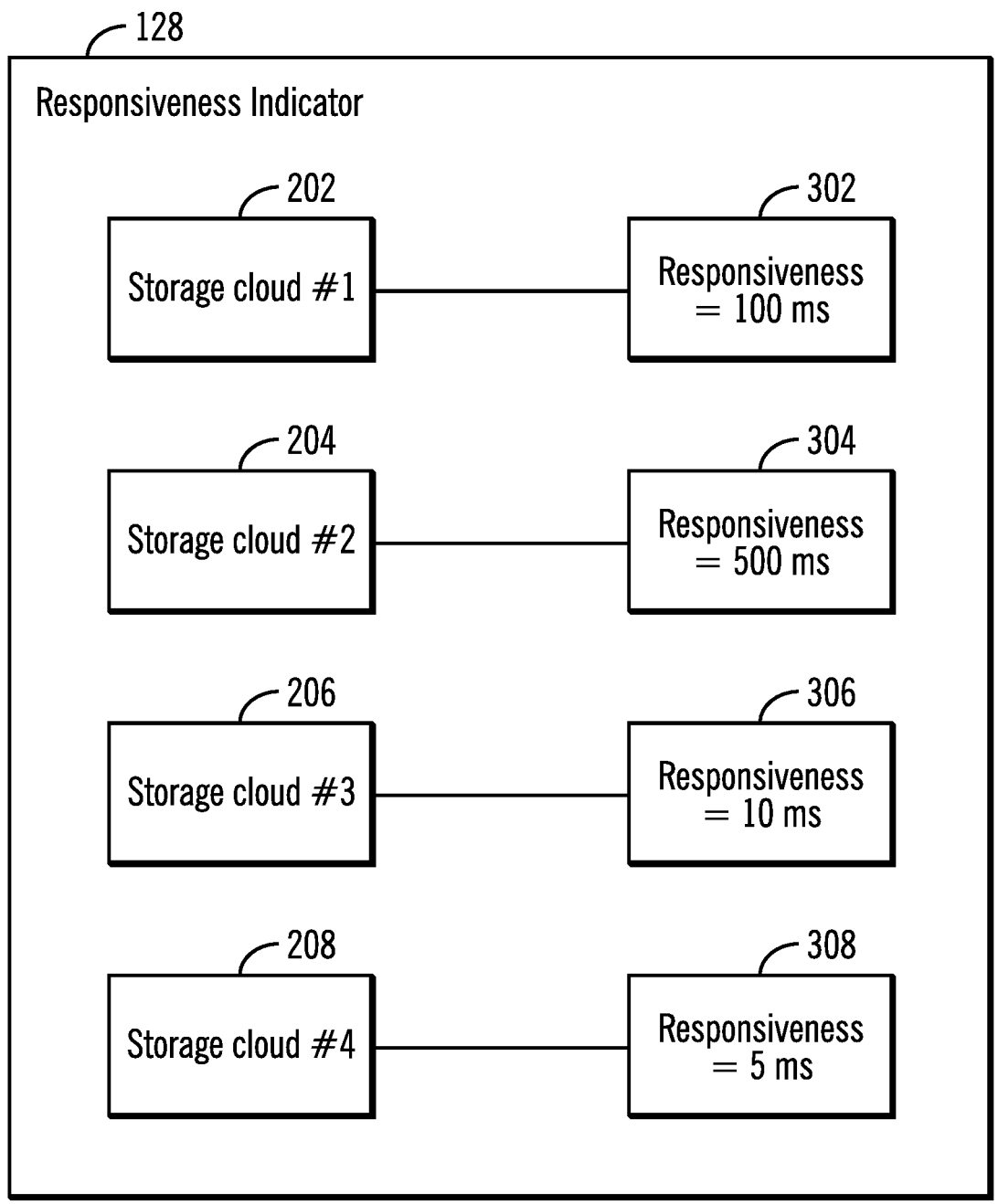
FIG. 3 illustrates a block diagram that shows a responsiveness indicator in the storage controller, in accordance with certain embodiments.

FIG. 3 illustrates a block diagram that shows a responsiveness indicator 128 in the storage controller 102, in accordance with certain embodiments. The responsiveness indicator 128 shows the responsiveness of each of the storage clouds to which the storage controller 102 is coupled. The responsiveness may be expressed in units of time such as milliseconds (ms). The responsiveness may be for storing datasets in the storage clouds and/or for executing applications in the storage clouds. The responsiveness may be determined based on historical response times from the storage clouds to requests from the storage controller 102. For example, if 100 prior executions of an application in a specific storage cloud has taken an average time of 13.5 ms, then the responsiveness of the specific storage cloud to the execution of the application may be 13.5 ms.

FIG. 3 shows the responsiveness for a specific application execution or for storing a dataset in each of the storage clouds 202, 204, 206, 208. The responsiveness is 100 ms for storage cloud 202 (as shown via reference numeral 302), 500 ms for storage cloud 204 (as shown via reference numeral 304), 10 ms for storage cloud 206 (as shown via reference numeral 306), and 5 ms for storage cloud 208 (as shown via reference numeral 308).

It should be noted that the responsiveness may be indicated in a variety of ways in the responsiveness indictor 128. In certain embodiments, the responsiveness may indicate the speed at which a storage cloud responds to requests from the controller 102.

Figure 4:
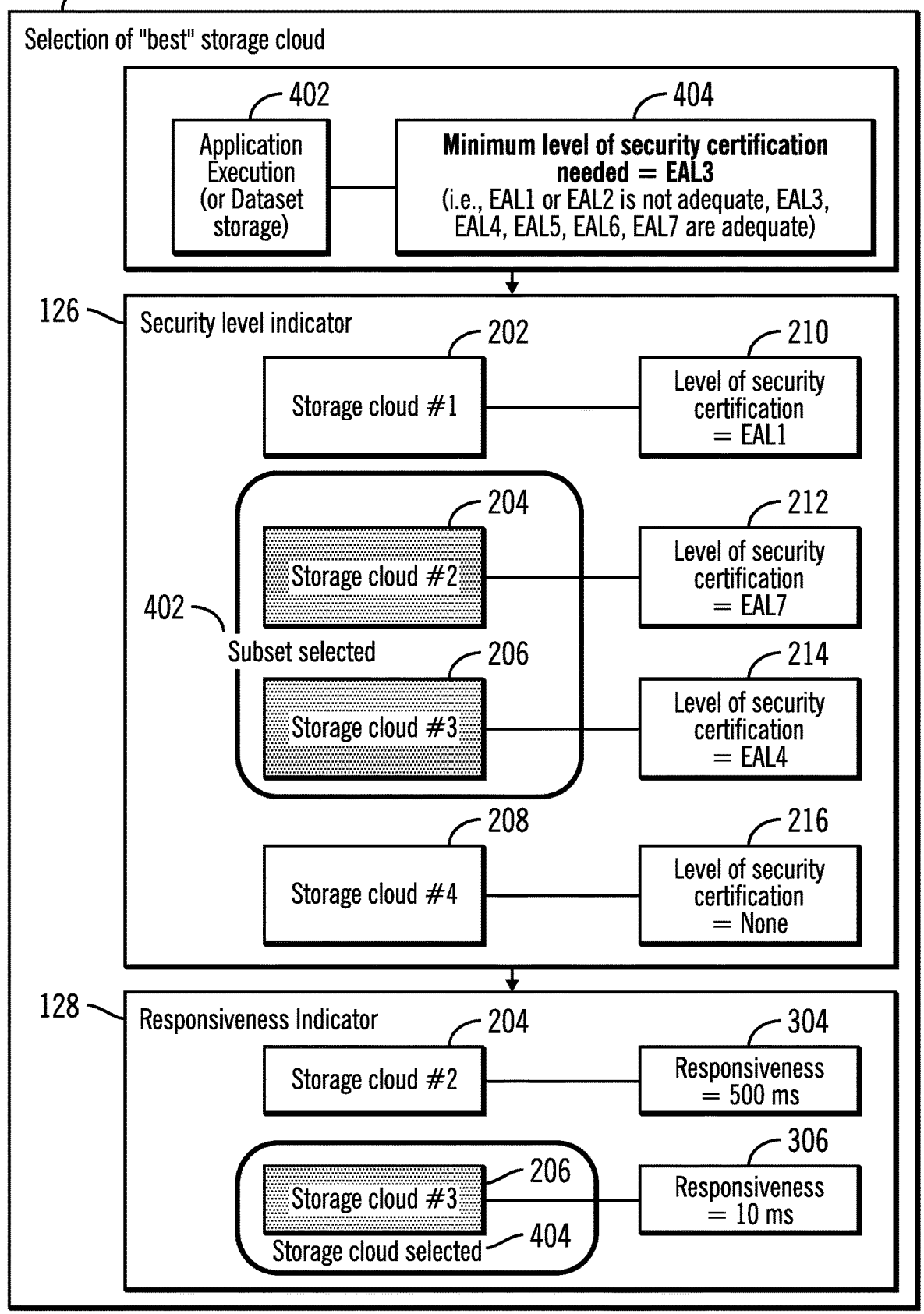
FIG. 4 illustrates a block diagram that shows selection of a storage cloud based on satisfying minimum security requirements and responsiveness, in accordance with certain embodiments.

FIG. 4 illustrates a block diagram 400 that shows selection of a storage cloud based on satisfying minimum security requirements and providing the best responsiveness, in accordance with certain embodiments.

The placement application 124 may determine that the execution of an application 402 (or a dataset storage) may require a minimum level of security certification of EAL3 in the storage cloud to which the placement application 124 sends the application for execution (as shown via reference numeral 404). In other words for execution of the application 402, EAL1 or EAL2 security certifications are not enough, but EAL3, EAL4, EAL5, EAL6, or EAL7 security certifications are adequate.

The placement indicator 124 determines by processing information included in the security level indicator 126 that the subset of storage clouds 204, 206 have at least the minimum security certification of EAL3 (as shown via reference numeral 402).

The placement indicator 124 then processes the information included in the responsiveness indicator 128 to determine which of the storage clouds of the subset of storage clouds 204, 206 has the best responsiveness. It is determined that storage cloud 206 has the best responsiveness, as storage cloud 206 has a responsiveness of 10 ms (reference numeral 306) which is better than the 500 ms (reference numeral 304) responsiveness of storage cloud 204. Therefore, storage cloud 206 is selected (as shown via reference numeral 404) for executing the application 402.

Figure 5:
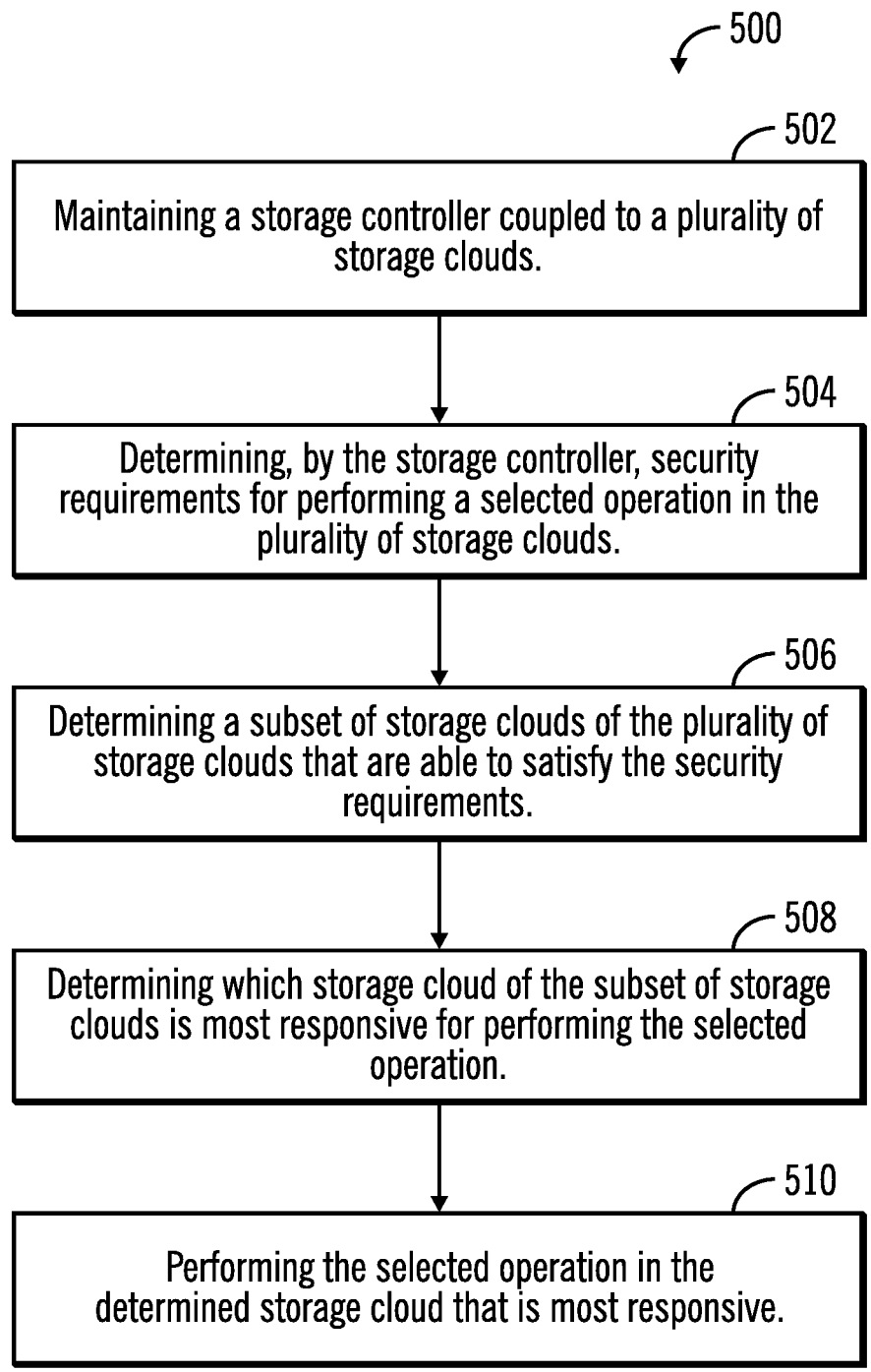
FIG. 5 illustrates a flowchart that shows selection of a storage cloud based on satisfying minimum security requirements and responsiveness, in accordance with certain embodiments.

FIG. 5 illustrates a flowchart 500 that shows selection of a storage cloud based on satisfying minimum security requirements and responsiveness, in accordance with certain embodiments.

Control starts at block 502 in which a storage controller 102 that is coupled to a plurality of storage clouds is maintained. The storage controller 102 determines (at block 504) security requirements for performing a selected operation in the plurality of storage cloud.

Control proceeds to block 506 in which a subset 402 of storage clouds of the plurality of storage clouds that are able to satisfy the security requirements are determined. A determination is made (at block 508) as to which storage cloud of the subset of storage clouds is most responsive for performing the selected operation.

Once it is determined which storage cloud of the subset of storage clouds is most responsive for performing the selected operation, then the selected operation is performed in the determined storage cloud that is most responsive (at block 510).

Figure 6:
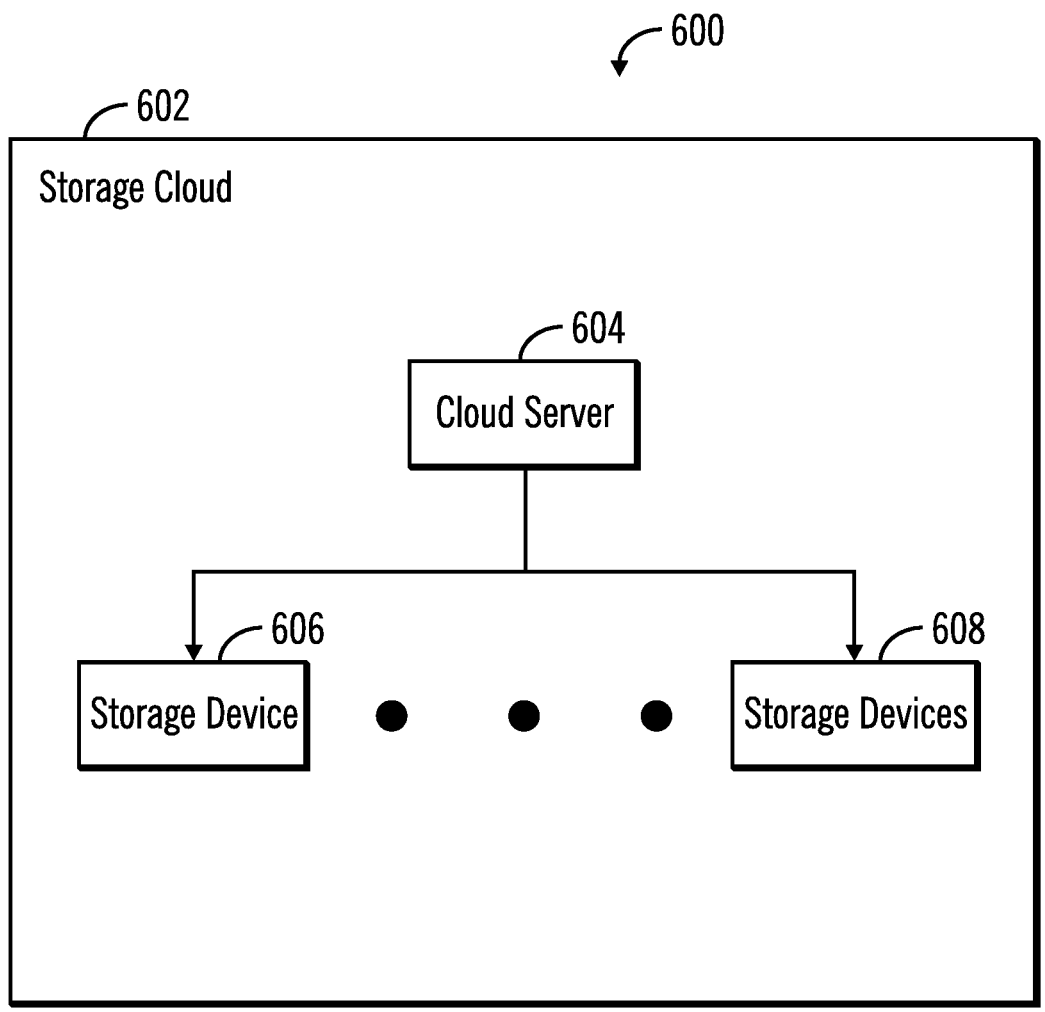
FIG. 6 illustrates a block diagram that shows a storage cloud comprised of a cloud server and a plurality of storage devices coupled to the cloud server, in accordance with certain embodiments.

FIG. 6 illustrates a block diagram 600 that shows a storage cloud 602 comprised of a cloud server 604 and a plurality of storage devices 606, 608 coupled to the cloud server 604, in accordance with certain embodiments. The cloud server 604 may comprise any suitable computational device including those presently known in the art, such as, a personal computer, a workstation, a server, a mainframe, a hand held computer, a palm top computer, a telephony device, a network appliance, a blade computer, a processing device, etc. The storage devices 606, 608 may comprise any suitable storage device comprising a disk drive, a tape drive, an optical drive, a solid state drive, etc. The storage cloud 602 may correspond to any of the storage clouds 114, 116, 118 shown in FIG. 1, or other storage clouds 202, 204, 206, 208 shown in FIGS. 2-4.

Therefore, FIGS. 1-6 illustrate certain embodiments in which a storage controller distributes data and/or applications in a plurality of storage clouds based on security requirements and responsiveness.

Dual Server Configuration for Security and Responsiveness in Cloud

Figure 7:
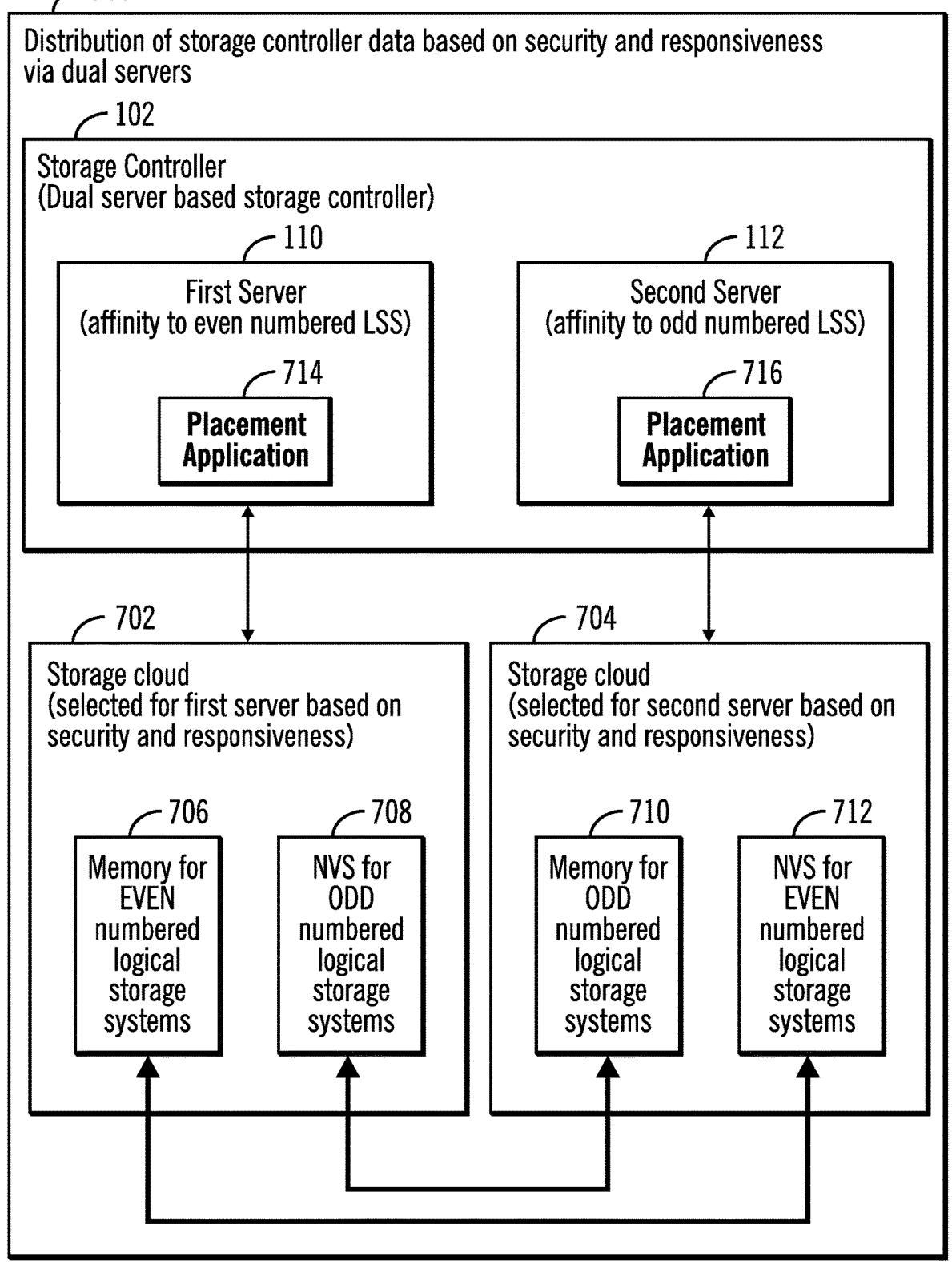
FIG. 7 illustrates a block diagram that shows a distribution of storage controller data based on security and responsiveness via placement applications in storage servers, in accordance with certain embodiments.

FIG. 7 illustrates a block diagram 700 that shows the distribution of storage controller data in storage clouds 702, 704 (selected from a plurality of storage clouds) based on security and responsiveness, via placement applications 714, 716 in storage servers 110, 112, in accordance with certain embodiments. The distribution of storage controller applications may also be performed based on security and responsiveness. While many different types of storage controllers may be used, FIG. 7 shows a particular type of storage controller in which the embodiments shown in FIGS. 1-6 may be implemented.

The storage controller 102 may provide virtualization capabilities for storage and simplify multiple storage systems into a single machine comprising dual servers 110, 112. The storage controller 102 allows hosts to address the storage via logical storage volumes maintained by the storage controller 102 in at least one or more cloud storages. The storage controller 102 tries to maintain two copies of the data while the data is moving through the storage controller 102 and the storage clouds coupled to the storage controller. When a write is issued to a logical storage volume and both the first server 110 and the second server 112 are operational, the write data is directed to the server that owns the logical storage volume. A logical storage volume may be a member of an even numbered logical subsystem (even numbered LSS) or an odd numbered logical subsystem (odd numbered LSS), where the storage controller 102 may manage storage in a plurality of logical subsystems (e.g., logical subsystems with identifying numbers ranging from 0 to 255).

In certain embodiments, the LSSs that have an even identifying number have an affinity with the first server 110, and LSSs that have an odd identifying number have an affinity with the second server 112. When a host issues a write to a logical volume, the storage controller 102 may direct that write to the server that owns (i.e., has affinity to) the LSS of which that logical volume is a member.

The block diagram 700 of FIG. 7 shows memory and non-volatile storage of the dual server based storage controller 102 being provided by two storage clouds 702, 704.

The first server 110 has affinity to even numbered logical subsystems (LSS), and the second server 112 has affinity to odd numbered LSS. The storage cloud 702 (selected from a plurality of storage clouds) assigned to the first server 110 based on security and responsiveness requirements provides memory 706 for the even numbered LSS to the first server 110, and provides non-volatile storage (NVS) 708 for the odd numbered LSS to the first server 110. The storage cloud 704 (selected from a plurality of storage clouds) provides memory 710 for the odd numbered LSS to the second server 112, and provides NVS 712 for even numbered LSS to the second server 112. The NVS 708 stores backup of data stored in memory 710, and the NVS 712 stores backup of data stored in memory 706.

Therefore, if the second server 112 is non-operational, then the operational first server 110 is able to perform the operations of the second server 112 by using the NVS 708 stored in the first storage cloud 202 assigned to the first server 110. The first server 110 of course keeps using the memory 706 provided by the first storage cloud 702 for operations directed at even numbered LSS, as the first server 110 has affinity to even numbered LSS. Furthermore, if the first server 110 is non-operational, then the operational second server 112 is able to perform the operations of the first server 110 by using the NVS 712 stored in the second storage cloud 204 assigned to the second server 112. The second server 112 of course keeps using the memory 710 provided by the second storage cloud 704 for operations directed at odd numbered LSS, as the second server 112 has affinity to odd numbered LSS.

In certain embodiment implemented in accordance with the mechanisms shown in FIGS. 1-6, the placement applications 714, 716 that execute in the first server 110 and the second server 112 respectively may be used to select the storage clouds 702, 704 out of a plurality of storage clouds for storing datasets of the storage controller 102 taking into account the security needs of the datasets and responsiveness of the storage clouds. The dual server configuration of the storage controller 102 provides protection for failure of a server of the dual servers 110, 112.

Further Cloud Computing Environments

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
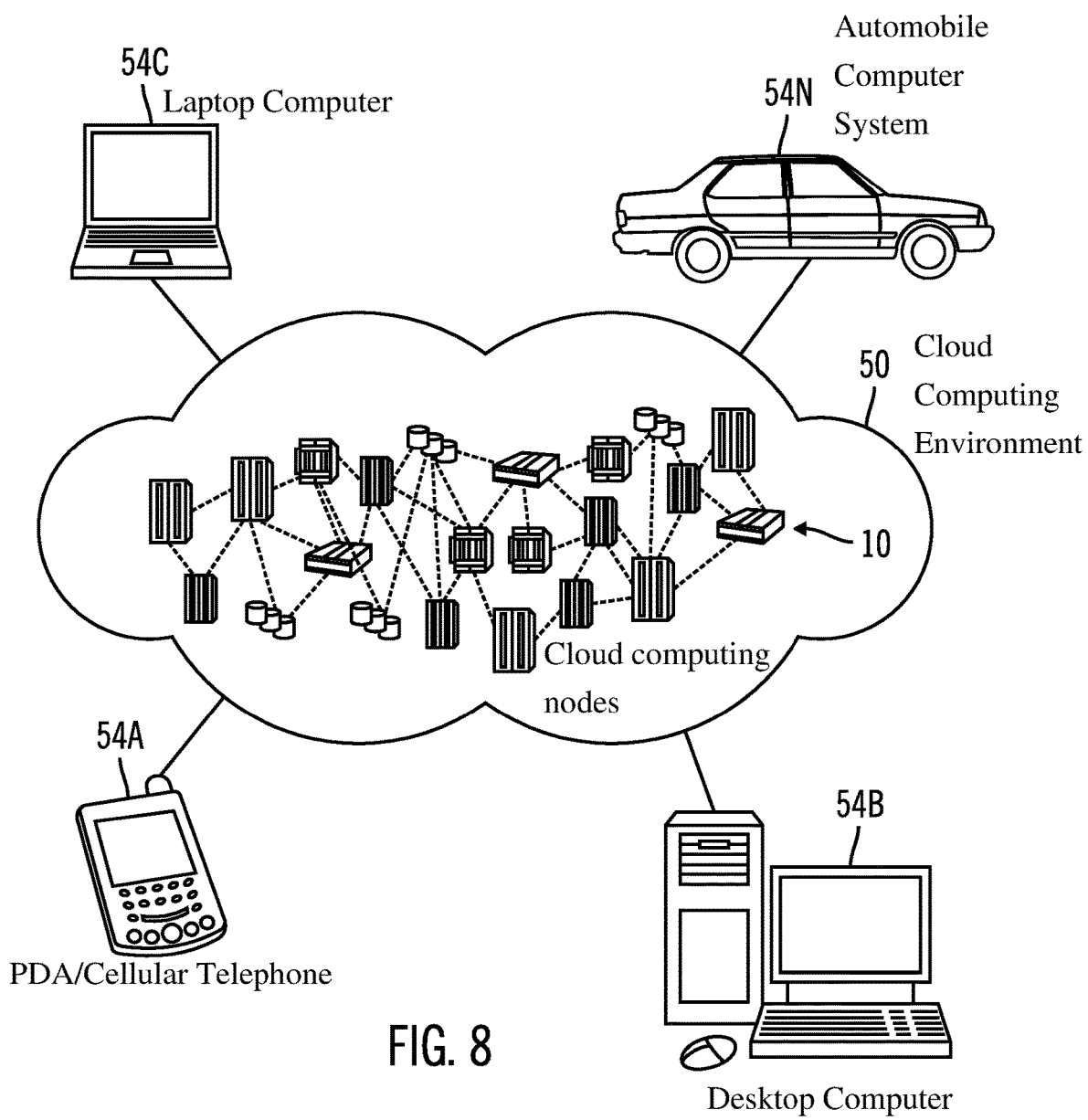
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that cloud computing nodes 10 and cloud computing environment 50 can communicate with any type of computerized device over any type of network and/or network addressable connection (e.g., using a web browser).

Figure 9:
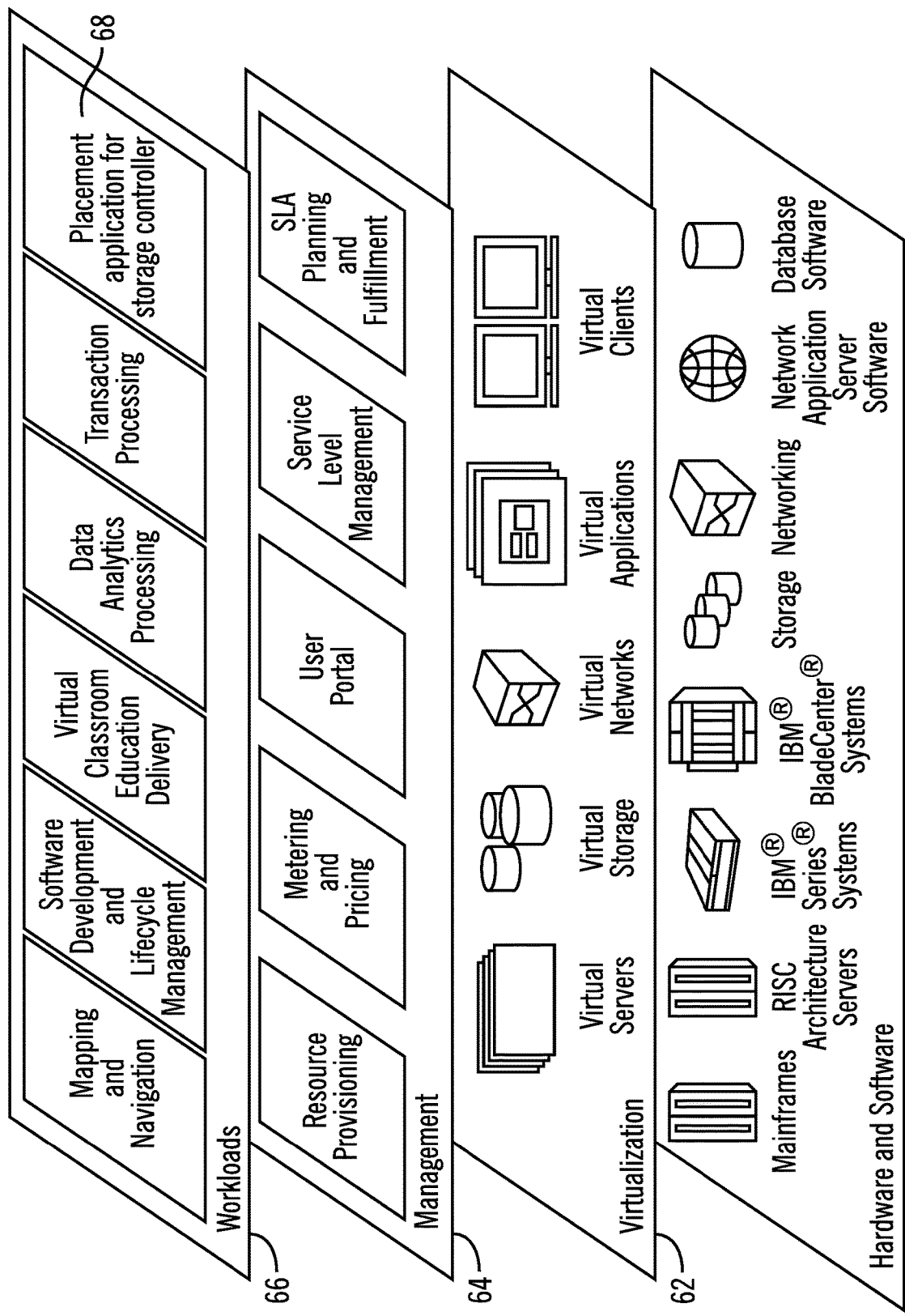
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the workload and functions provided by the placement applications 124, 714, 716 for the dual server storage controller 102 (shown via reference numeral 68 in FIG. 9) as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
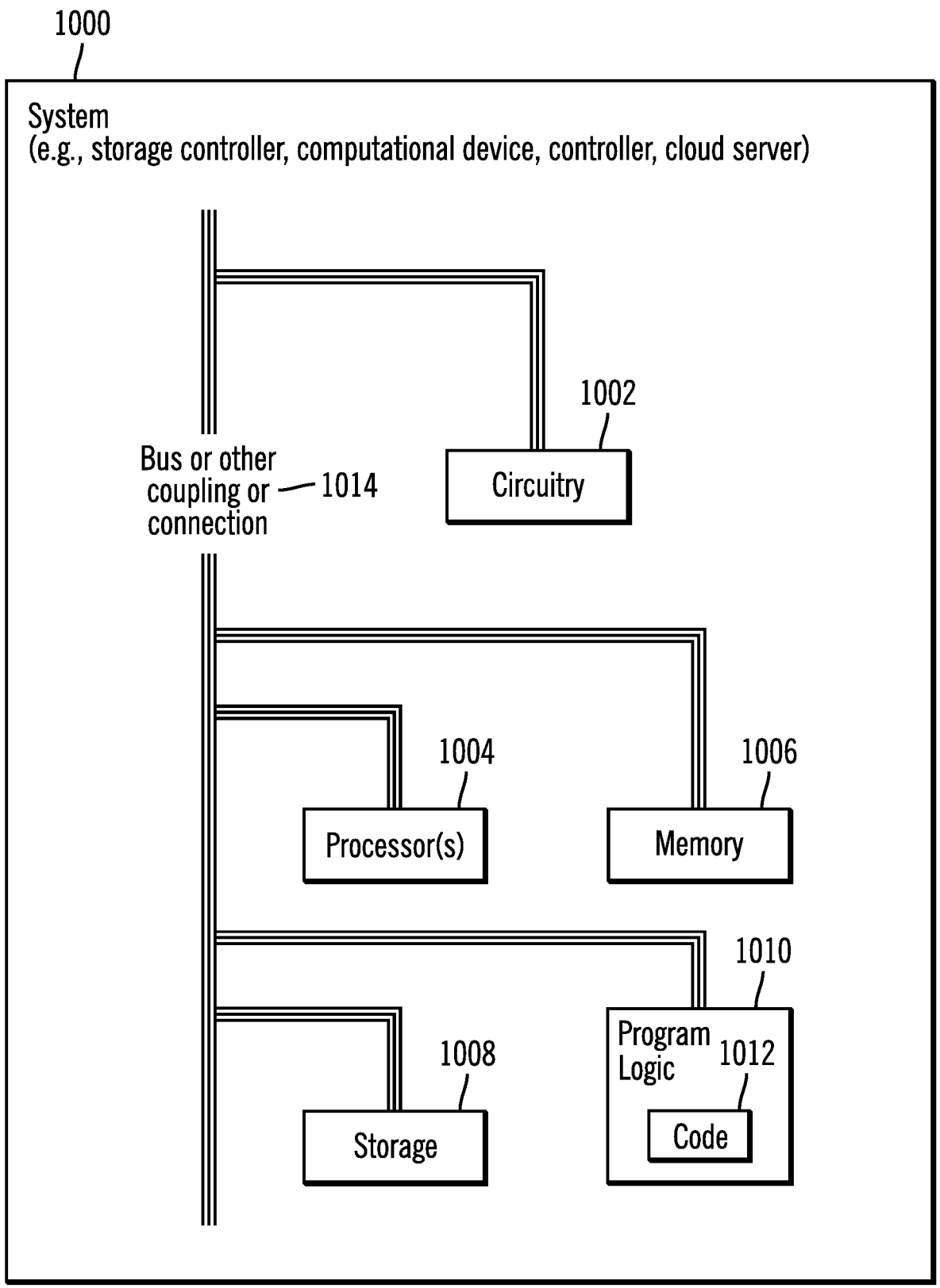
FIG. 10 illustrates a block diagram of a computational system that shows certain elements that may be included in the storage controller including servers shown in FIG. 1, and in cloud servers of storage clouds shown in FIG. 6, in accordance with certain embodiments.

FIG. 10 illustrates a block diagram that shows certain elements that may be included in the storage controller 102, the servers 110, 112, the hosts 106, 108 or other computational devices such as those in storage clouds shown in FIGS. 1-9 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    maintaining a storage controller that controls a plurality of storage clouds;
    determining a minimum level of security certification required for performing a selected operation in the plurality of storage clouds;
    determining a subset of storage clouds of the plurality of storage clouds that are able to satisfy the minimum level of security certification;
    determining which storage cloud of the subset of storage clouds has a fastest responsiveness among the subset of storage clouds; and
    performing the selected operation in the determined storage cloud that has the fastest responsiveness among the subset of storage clouds.

2. The method of claim 1, wherein the selected operation comprises storing a dataset.

3. The method of claim 2, wherein the selected operation further comprises executing an application.

4. The method of claim 1, the method further comprising:
    maintaining, in the storage controller, a security level indicator that indicates a level of security certification of each of the plurality of storage clouds; and
    determining from the security level indicator the subset of storage clouds of the plurality of storage clouds that are able to provide the minimum level of security certification.

5. The method of claim 4, wherein the level of security certification comprises Evaluation Assurance Levels (EAL) ranging from 1 to 7 in a Common Criteria standard.

6. The method of claim 1, the method further comprising:
maintaining, in the storage controller, a responsiveness indicator that indicates a responsiveness of each of the plurality of storage clouds based on historical statistics collected on responsiveness of each of the plurality of storage clouds for responding to the storage controller; and
determining which storage cloud of the subset of storage clouds has a fastest responsiveness among the subset of storage clouds for performing the selected operation from the responsiveness indicated in the responsiveness indicator.

7. A system comprising a storage controller that controls a plurality of storage clouds, the system comprising:
a memory; and
a processor coupled to the memory, wherein the processor performs operations, the operations comprising:
determining a minimum level of security certification required for performing a selected operation in the plurality of storage clouds;
determining a subset of storage clouds of the plurality of storage clouds that are able to satisfy the minimum level of security certification;
determining which storage cloud of the subset of storage clouds has a fastest responsiveness among the subset of storage clouds; and
performing the selected operation in the determined storage cloud that has the fastest responsiveness among the subset of storage clouds.

8. The system of claim 7, wherein the selected operation comprises storing a dataset.

9. The system of claim 8, wherein the selected operation further comprises executing an application.

10. The system of claim 7, the operations further comprising:
maintaining, in the storage controller, a security level indicator that indicates a level of security certification of each of the plurality of storage clouds; and
determining from the security level indicator the subset of storage clouds of the plurality of storage clouds that are able to provide the minimum level of security certification.

11. The system of claim 10, wherein the level of security certification comprises Evaluation Assurance Levels (EAL) ranging from 1 to 7 in a Common Criteria standard.

12. The system of claim 7, the operations further comprising:
maintaining, in the storage controller, a responsiveness indicator that indicates a responsiveness of each of the plurality of storage clouds based on historical statistics collected on responsiveness of each of the plurality of storage clouds for responding to the storage controller; and
determining which storage cloud of the subset of storage clouds has a fastest responsiveness among the subset of storage clouds for performing the selected operation from the responsiveness indicated in the responsiveness indicator.

13. A computer program product, the computer program product comprising a computer readable storage medium having computer readable program code embodied therewith, the computer readable program code configured to perform operations, the operations comprising:
maintaining a storage controller that controls a plurality of storage clouds;
determining a minimum level of security certification required for performing a selected operation in the plurality of storage clouds;
determining a subset of storage clouds of the plurality of storage clouds that are able to satisfy the minimum level of security certification;
determining which storage cloud of the subset of storage clouds has a fastest responsiveness among the subset of storage clouds; and
performing the selected operation in the determined storage cloud that has the fastest responsiveness among the subset of storage clouds.

14. The computer program product of claim 13, wherein the selected operation comprises storing a dataset.

15. The computer program product of claim 14, wherein the selected operation further comprises executing an application.

16. The computer program product of claim 13, the operations further comprising:
maintaining, in the storage controller, a security level indicator that indicates a level of security certification of each of the plurality of storage clouds; and
determining from the security level indicator the subset of storage clouds of the plurality of storage clouds that are able to provide the minimum level of security certification.

17. The computer program product of claim 16, wherein the level of security certification comprises Evaluation Assurance Levels (EAL) ranging from 1 to 7 in a Common Criteria standard.

18. The computer program product of claim 13, the operations further comprising:
maintaining, in the storage controller, a responsiveness indicator that indicates a responsiveness of each of the plurality of storage clouds based on historical statistics collected on responsiveness of each of the plurality of storage clouds for responding to the storage controller; and
determining which storage cloud of the subset of storage clouds has a fastest responsiveness among the subset of storage clouds for performing the selected operation from the responsiveness indicated in the responsiveness indicator.

* * * * *